United States Patent [19]

Sauer et al.

[11] 4,319,552
[45] Mar. 16, 1982

[54] PRE-COMBUSTION SYSTEM FOR INTERNAL COMBUSTION ENGINES

[76] Inventors: Fred N. Sauer, 454 Hammersmith Rd.; J. Brian Barry, 12872 Conway Rd., both of St. Louis, Mo. 63141

[21] Appl. No.: 126,386

[22] Filed: Mar. 3, 1980

[51] Int. Cl.³ .............................................. F02B 19/10
[52] U.S. Cl. .................................... 123/297; 123/267; 123/DIG. 3; 123/DIG. 1
[58] Field of Search ................. 123/267, 26, 531, 536, 123/DIG. 12, DIG. 1 A, DIG. 3, 297, 169 PA, 169 PH, 585, 187.5 R

[56] References Cited

U.S. PATENT DOCUMENTS

| | | | |
|---|---|---|---|
| 1,162,804 | 12/1915 | Penquite | 123/267 |
| 2,213,132 | 7/1940 | Ackerman | 123/531 |
| 2,238,852 | 4/1941 | Regar | 123/169 PA |
| 3,946,711 | 3/1976 | Wigal | 123/536 |

FOREIGN PATENT DOCUMENTS

| | | | |
|---|---|---|---|
| 36350 | 5/1930 | France | 123/169 V |
| 289563 | 10/1931 | Italy | 123/267 |

Primary Examiner—Raymond A. Nelli
Attorney, Agent, or Firm—Rogers, Eilers & Howell

[57] ABSTRACT

Sparkplug means for an internal combustion engine are provided with conduits to introduce pre-combustion gases directly to a mixing area adjacent the sparking electrodes. This may be by connecting the conduits into the plug directly or by connecting them into an adapter to be interposed between the engine and the sparkplug, and providing a pre-combustion chamber therebetween. Preferably there is a mixing area upstream of the electrodes. An electrolyzer can be built into the arrangement to generate the pre-combustion gases immediately adjacent the sparkplug.

15 Claims, 6 Drawing Figures

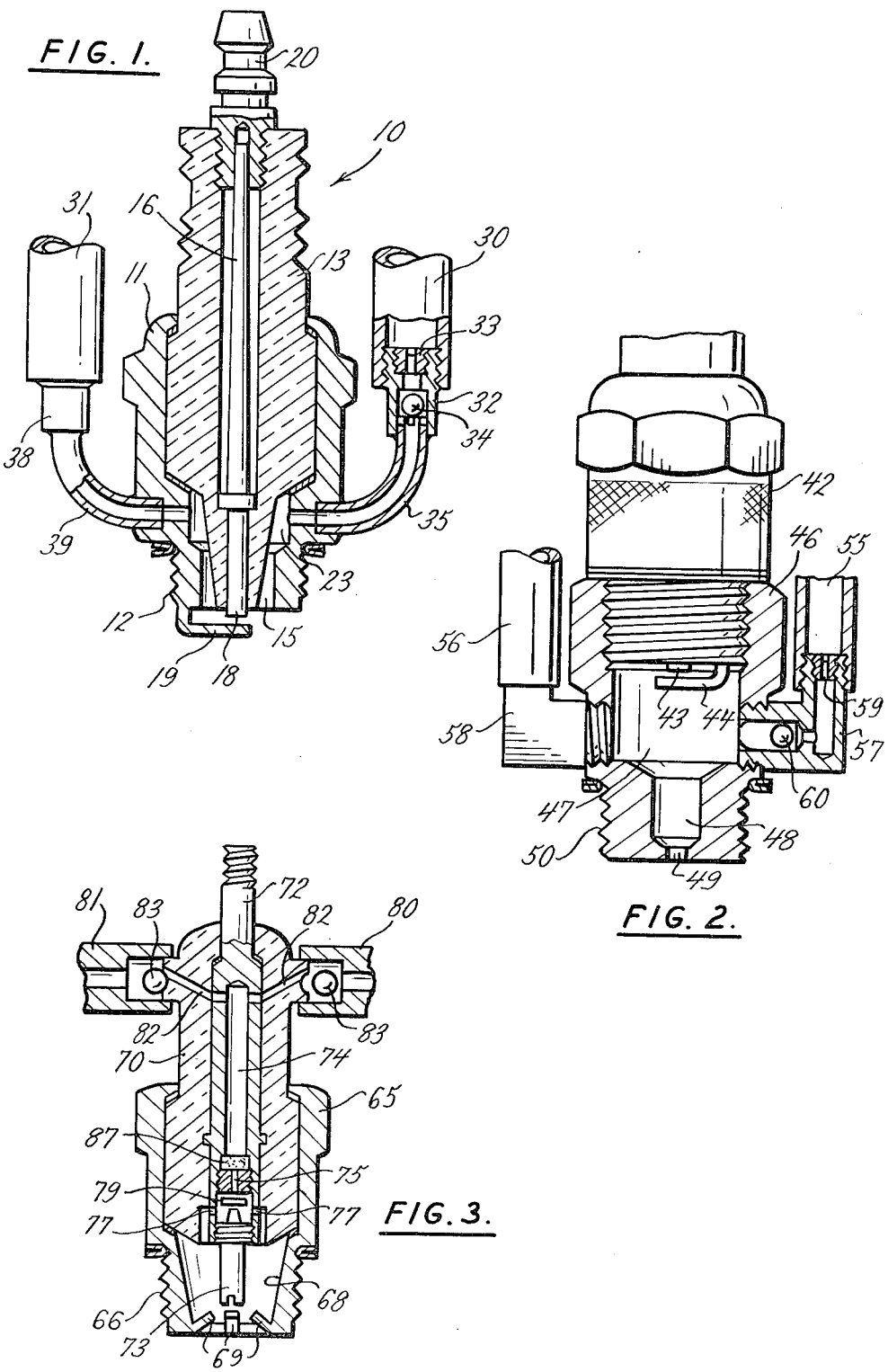

PRE-COMBUSTION SYSTEM FOR INTERNAL COMBUSTION ENGINES

BACKGROUND AND OBJECTS OF THE INVENTION

The invention relates to improving combustion within the cylinders of an internal combustion engine by directing highly-combustive gases thereinto. In the past, gases such as hydrogen and oxygen have been introduced into internal combustion engines, usually by way of the intake manifold as shown in U.S. Pat. Nos. 1,876,879 and 3,074,390. One problem with these is that they must conduct an explosive mixture of hydrogen and oxygen gases some distance from their source to the manifold or other part of the engine. One of the objects of the present invention is to minimize this danger. In connection with the foregoing, the present invention conducts the separate gases to the combustion space, adjacent the point for ignition, thereby avoiding the possibility of explosion of a combustible mixture, and the invention further mixes them at the point of ignition to get the maximum benefit thereof as pre-combustion agents.

In the past there have been arrangements to introduce the pre-combustion gases into the cylinder adjacent the sparkplug. This has the disadvantages of requiring separate fittings into the engine and of separating the combustible mixture of gases from the sparkplug. An object of the present invention is to introduce the gases at the sparkplug electrodes where ignition can take place and the flame rapidly propagated throughout the combustion chamber.

It has also been proposed, to produce an explosive mixture of other gases into the cylinders to explode the hydrocarbon mixture therein, as in the Nissan patents typified by U.S. Pat. No. 3,980,064. And an experimental plasma jet ignition has been proposed, as shown in Popular Science for September, 1979 discussing the work of Professor Oppenheim. This proposal, employing a generator for producing a plasma rather than a combustible mixture, requires a timing mechanism lest the plasma be continually delivered to the cylinders on other than the power strokes of the pistons. An object of the present invention is to avoid that kind of a problem. The amount of pre-combustion gases delivered in the present invention is small so that continuous delivery thereof could not make a significant difference, although the invention does not exclude timing the feed of the pre-combustion gases.

A further object of the invention is to provide, in combination with a spark ignition means, a chamber adjacent the engine cylinder into which ignitable pre-ignition gases may be introduced and mixed, ignited and expelled into the engine cylinder.

Other objects of the invention are to provide for the use of leaner fuel-air mixtures resulting in cleaner combustion and better fuel economy; for simplified carburetor design including elimination of the traditional choke; for elimination of knock and pre-ignition; for elimination of the rich mixtures and their effect on catalytic convertors and the atmosphere; for lowering the required ignition voltages giving cheaper, longer-lived ignition systems; and for permitting short-duration, high-power output where stored gases are used.

IN THE DRAWINGS

FIG. 1 is a diametrical vertical section through a sparkplug with a form of the present invention incorporated therein;

FIG. 2 is a partial diametrical section of an adapter arrangement using a regular sparkplug;

FIG. 3 is a view in diametrical section of a combination sparkplug and pre-combustion arrangement;

Figure 5:
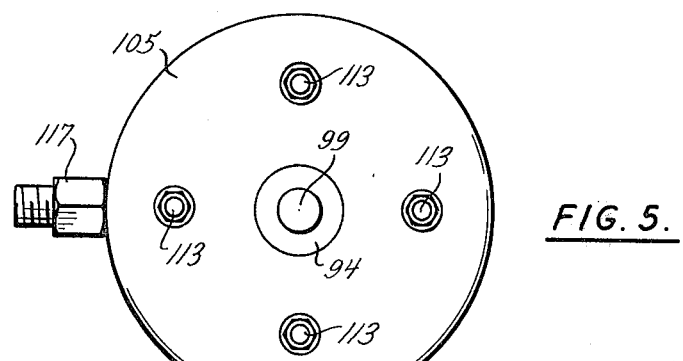
FIG. 5 is a top view of the generator of FIG. 4.

The invention will be described as applied to a single cylinder of a gasoline engine, but it can be equally well used with multi-cylinder engines.

DESCRIPTION OF THE FIRST EMBODIMENT

In FIG. 1 a schematically shown sparkplug 10 has a metal conducting shell 11 (usually made negative) having threads 12 by means of which it may be secured in conventional fashion in a cylinder of an internal combustion engine. It is hollowed out from end to end, to receive an insulation plug 13, usually of porcelain-type material, with its lower end tapered downwardly. As is known in the art, these parts are firmly secured together. There is a cylindrical chamber 15 formed at the bottom of the passage through the shell 11, below the insulator 13.

The insulator 13 contains a metal anode 16. This anode extends through the cylindrical chamber 15 and projects to provide an electrode tip 18, that is adapted to cooperate with an electrode 19 secured to and electrically connected to the shell 11. The anode 16 also extends through the top of the insulating plug 13 and has the typical wire attachment device 20 thereon.

It will be seen that the insulator 13 seals against the metal shell 11, but adjacent its tapered lower end the chamber 14 has an enlarged, circular upper portion 23.

It has been proposed in the art to use the available source of direct current in connection with internal combustion engines to electrolyze water or a similar electrolyte to generate hydrogen and oxygen to be delivered to the intake manifold of the engine (see for example, U.S. Pat. No. 4,023,545). The electrolyzer may be connected with the ignition switch mechanism so as to be energized only when the ignition is connected to the electrical supply of the engine, or may be separately controlled. It is unnecessary to describe the electrolyzing system for the purposes of FIG. 1. Suffice it to say that two gas inlet tubes are provided at 30 and 31, one of which can typically conduct hydrogen from the electrolysis system and the other can typically conduct oxygen.

Assuming that the tube 30 is conducting hydrogen, it connects via a fitting 32, through a replaceable metering jet 33, and a ball check valve 34 that permits downflow of gas but prohibits backflow under pressure. Downstream of the valve, the fitting 32 connects to a tube 35 that enters the sparkplug mixing chamber portion 23 in the manner illustrated.

In like fashion the tube 31 conducts oxygen through a similar metering jet and check valve 38 to a pipe 39 that also enters into the sparkplug chamber 23 in the manner illustrated.

At the start, it is assumed that the supplies of gases are available and are delivered to the pipes 30 and 31 (Cf. U.S. Pat. No. 3,311,097, FIG. 12), that the plug 10 is connected into a cylinder of an internal combustion engine, that the metal of the engine and hence the metal shell 11 of the plug are duly connected to the cathode of the electrical system of the vehicle, and that the terminal 20 is connected to the anode of that system. With this arrangement, the hydrogen and oxygen are delivered separately but directly to the chamber 23 where they mix, and then flow to the lower part of the chamber 15, to emit adjacent the two electrodes 18 and 19 of the sparkplug. The oxygen and hydrogen, in the presence of the spark, explode and expand rapidly to deliver a hot flame into the cylinder of the engine. This flame propagates with great rapidity and heat so as to cause very rapid and complete explosion of the fuel mix otherwise conventionally presented to the cylinder.

With this arrangement, the oxygen and hydrogen are separately conducted to the sparkplug, rather than being conducted together, in an explosive mixture, so that there is no danger of their exploding en route from the electrolyzer to the plug.

FIG. 2 shows another arrangement in which a conventional plug is combined with an adapter that provides mixing and pre-combustion space. In FIG. 2 the conventional schematically-shown sparkplug 42 has electrodes 43 and 44, and is threaded into a metallic conductive adapter shell 46. The lower end of the shell 46 is externally threaded at 50 with threads corresponding to those on the appropriate sparkplug for that engine. This shell has a mixing and pre-combustion chamber 47 extending at 48 into the area of the top of the cylinder, and connecting therein through a port 49.

Tubes 55 and 56 conduct the special pre-combustion gases to fittings 57 and 58 that are threaded into the chamber 47. As is illustrated, each port has a removable metering orifice member 59 in it, and a ball valve 60 that will let gas flow into the pre-combustion chamber but not flow away from it.

The operation of this type of FIG. 2 is similar to that of FIG. 1. It has the advantage that it can be used with a conventional sparkplug without changing the plug. Also it provides a chamber in which the pre-combustion gases can mix in thoroughly so as to improve the speed of combustion thereof. This arrangement permits ready replacement of sparkplugs without changing the pre-combustion chamber, and vice versa.

In FIG. 3 an arrangement is shown that provides the pre-combustion chamber in a unitary arrangement with the sparkplug, but in such compact form as to be of little greater cost than the plug itself. There is shown a metal shell 65 threaded at its lower end 66 to be introduced into the cylinder of the engine as is an ordinary sparkplug. The shell is hollow as illustrated, and provides a cylindrical upper interior portion and a downwardly tapering lower portion 68 with inturned electrodes 69 at its lower end. The chamber 68 opens directly into the cylinder of the engine.

The arrangement also has an insulator 70 which, like the plug 13, may be of porcelain or similar material that can withstand the pressure and heat and hard service to which these devices are subjected. The insulator is sealed with the shell 65 in a manner known to this art. Extending axially through the insulator 70 is an anode 72 of conductive metal. At its lower end, this anode has a replaceable center electrode 73 threadedly secured in it. It also has an axially disposed mixing chamber 74 in its upper end and terminating from its bottom in a metering port 75. This port opens through a plurality of gas ports 77 into a recess in the lower end of the plug 13, and thence into the chamber 68. A flap check valve 79 permits flow of gases toward the electrodes but prevents contrary flow.

The anode also has two gas tubes 80 and 81 for the introduction of the pre-combustion gases in the manner previously described. As is illustrated, each of the tubes 80 and 81 is sealingly connected into the porcelain plug 70, in communication with passage 82 leading through the plug 70 and the anode 72, into the mixing chamber 74. This passage is controlled by a back check valve 83, that permits ingress but not egress of gases from the chamber 74.

By the foregoing means the gases are introduced into the mixing chamber 74 where they can be mixed. They are then forced down through a flash-back inhibitor 87, thence through the replaceable metering port 75, and past a flap check valve 79, thence by way of the passages 77 into the pre-combustion chamber 68 where they can be ignited by the spark jumping between the electrodes 73 and 69; thence the explosive mixture emits from the bottom of the device into the engine cylinder.

Figure 4:
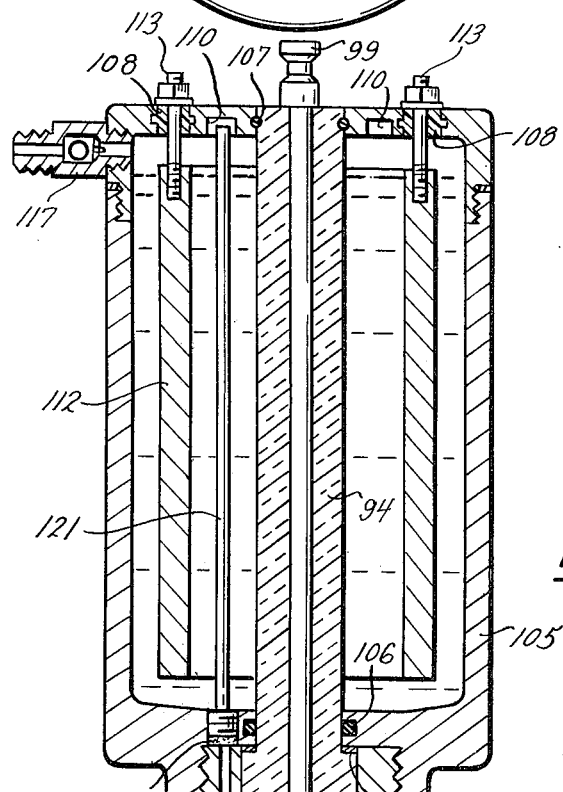
FIG. 4 is diametrical section of the present invention incorporating a gas generator into a unitary structure applicable to an engine cylinder.

FIG. 4 illustrates a form of the invention combining a gas generator with the sparkplug and pre-combustion or mixing chamber. To this end there is a metallic housing 90 threaded at 91 to fit into the sparkplug opening of the engine. It has electrodes 92 in it and a gas port 93 to open into the cylinder of the engine.

An insulator plug 94 of porcelain or the like that may be inserted downwardly into the housing 90 is sealed into it against ribs 95, with appropriate metal gaskets. The plug 94 has a tapered lower end 96 projecting into the shell 90, and with the shell forming a mixing chamber 97. The insulator 94 extends a distance above the shell 90, and contains an axially disposed anode 98. The anode extends above the insulator to provide a connector 99 to receive an electrical lead. It also projects below the insulator 96 to provide an electrode 100 adjacent the electrodes 92 near the bottom of the chamber 97. The plug 94 has a shoulder 101 for a purpose to appear.

To the upper end of the housing 90 is threaded an enlarged shell 105, also of metal to be conductive, and designed to contain an electrolytic liquid, usually acidulated water. The lower end of the shell 105 projects inwardly over the shoulder 101 of the plug, and is sealed against the plug, and has an O-ring 106 to prevent vapor and liquid passage. When the housing 90 is threaded onto the shell 105, the insulator 94 is sustained between the ledge 95 and the shoulder 101. Appropriate copper gaskets are interposed in these fits.

At its upper end the top of the shell 105 fits snugly around the insulator 94, and is sealed thereto by an O-ring 107. Its top also has a plurality of openings, here four in number, with insulating disks 108 tightly fitted therein (FIGS. 4,5). Also the upper end of shell 105 has a downwardly opening circular groove 110 for a purpose to appear.

A gas generation electrode, usually an anode 112, cylindrical in shape, is suspended within the shell 105 by means of connectors 113 that extend through the collars 108 and support the anode, as by threads. Thus, the connectors can be of electrically conducting material and can be connected to a source of positive potential. The collars 108 are of insulating material so that there is no short circuit. As noted, the anode 112 is suspended below the top of the shell 105. Near the top of the shell 105 there is a check valve fitting 117 that may be connected to a replenishment source for the electrolyte. This electrolyte normally reaches a level as indicated in the drawing.

A gas passage from the upper end of the shell 105 to the chamber 97 is formed as follows: the lower shell 90 has a gas passage 120 opening into the chamber 97 near the upper end of the chamber. At the top of this passage 120 a gas standpipe 121 is threaded (FIGS. 4,6) over a flame arrester 122. The standpipe 121 extends upwardly into the circular groove 110 in the top part of the shell 105.

Operation

The basic operation has been explained in connection with FIG. 1, by which the pre-combustion gases are delivered to the immediate area of the spark electrodes and there ignited by the spark to provide a pre-combustion flame. (Pre-combustion as here used refers to location of the mixed gases rather than to the precise timing of the spark relatively to the regular fuel mixture.) For present purposes we will assume that the gases being delivered are hydrogen through the pipe 30 and oxygen through the pipe 31. It will also be assumed that the generation of these gases is controlled through the same mechanism that renders the gasoline engine operative or inoperative, as is known in the art, although it may be separately controlled.

In FIG. 1, the pre-combustion gases are delivered into the mixing chamber 23 where they can become thoroughly mixed and then move down through the outlet 15 adjacent the spark electrodes 18, 19. There they are ignited, causing a very rapid expansion and very rapid increase in temperature, and likewise causing a very rapid spread of flame throughout the combustion chamber of the engine.

The ball check valves 34 in FIG. 1 permit ingress of the supplemental fuel gases but prohibit backflow when the pressure in the chamber 15 exceeds the incoming pressure of the gases. Such condition would exist as the explosion occurs. The metering jets 33 are provided to control the amount of gas entering the system.

The exploding pre-combustion or supplemental gases improve the explosion rate and completeness of combustion of the regular fuel mix delivered to the engine cylinder from the injector or carburetor. The pre-combustion gases may take the place of the usual rich starting mixture and can eliminate the need for a traditional choke. They can enable a leaner fuel air mixture to be used for the operation of the engine, which results in cleaner combustion and better fuel economy. They also can eliminate knock as well as reduce the rich fuel mixtures that are exhausted through the catalytic converters to the atmosphere. They can lower the required ignition voltages, giving a cheaper, longer-lived ignition system. They can permit a short duration, high-power output where stored gases are used.

While mainly it is expected that hydrogen and oxygen or air will be those supplied, other gases can be used, such as methane, ethane, propane, butane, carbon monoxide, or acetylene.

TABLE I

Gas Mixtures

Hydrogen and oxygen or air
Methane
Ethane
Propane
Butane
Carbon Monoxide
Acetylene In FIG. 1 it is to be observed that the two gases are delivered separately from the electrolytic generator to the sparkplug. Thus they are not in an explosive mixture during transit. Some of the equipment heretofore proposed combines the gases at the gas generator and then delivers the explosive mixture over a fairly extended distance to the combustion chambers of the engine. This means that over that distance an explosion can take place if by any means the ignition temperature of the gases is reached.

Because of the delivery of the gases close to the sparkplug, they are in immediate contact with the electrodes of the plug and can be ignited instantly. This is an advantage over former systems wherein the gases are delivered to the intake manifold or to the combustion chambers of the engine. The present system enables the gases to be mixed more thoroughly and to be ignited before they enter the combustion chamber and before they are attenuated by dilution by the regular fuel mixture.

The arrangement of FIG. 2 is one that is designed to permit the use of conventional sparkplugs with only an adapter. With that arrangement, the sparkplug is threaded into the adapter and the adapter then threaded into the engine block.

In all of the present designs, the geometry is adjusted to suit the particular engines with which the device is to be used. As a general rule, the mixing chamber is to be small so as to conserve supplemental gas. FIG. 2 affords pre-combustion space whose geometry may be optimized for different engines more easily than is possible with the arrangement of FIG. 1. In FIG. 2 the explosion of the supplemental fuel occurs in the mixing space 47, and the flames expel through the port 49 to cause ignition of the fuel mix supplied in regular fashion to the engine.

One of the advantages of FIG. 2 is that if either the sparkplug or the adapter must be changed, either can be done without exchanging the other. This is not true with the arrangement of FIG. 1.

FIG. 3 is designed to provide a more compact arrangement than FIG. 1. As is evident from the drawing, the two gases are brought down through the pipes 80 and 81, and passing the ball valves as before, enter the mixing chamber 74. There they are thoroughly mixed, and then passed through a flash-back protector or flame arrestor 87 and through the metering jet 75, that is sized to provide the proper flow of gas. The gases displace a flap valve 79, and then flow down through the passages 77 to the pre-combustion space 68.

In this example, the gases are mixed in the mixing chamber 74 so that they are in the ideal combustion state when they reach the chamber 68. There they are given further turbulence to maintain a good mixture and flow down to the spark area at the bottom of the anode 73. There they are exploded and enter the combustion chamber of the engine as heretofore described. In this case the back pressure is attenuated by the sizes of the passages 77 and is inhibited by the check valve 79. The flashback protector 87 prevents flames from entering the mixing chamber 74.

As is seen from the drawing, this is a very compact arrangement, although it would require separately designed elements combining the sparkplug with the pre-combustion gas components. In this arrangement as in the two previous ones, the two pre-combustion gases are brought into the sparkplug itself or to a pre-combustion chamber immediately adjacent the electrodes of the sparkplug.

The example of FIG. 4 has the foregoing basic features, and it adds the presence of the electrolyzer in direct combination with the sparkplug and the pre-combustion chamber. The lower housing 90 is threaded at 91 into the sparkplug opening of the engine and is thereby grounded. An electrolyte, which may be water with a few drops of sulfuric acid or the like, is supplied through the fitting 117 in the upper shell 105 up to approximately at the fitting 117. At least one of the supporting connectors 113 is connected to another pole of the (usually positive) voltage source. As stated, this may be through a switch separately operated, or one operated in connection with the ignition for the engine so that it is energized only when the engine is operative. If a separate switch is used, this generator may be caused to operate before the engine is started.

Assuming the usual grounding of the negative source, the application of the positive voltage to the anode 112 with the shell grounded causes the generation of hydrogen and oxygen from the electrolyte. These gases rise to the top, enter the circular groove 110, and pass down under pressure through the standpipe 121 and the passage 120 to enter the chamber 97. There they are further mixed as previously described, and flow downwardly to the sparking area of the electrodes 92 and 100. Explosion takes place and the exploding gases flow out the outlet 93 to perform the combustion of engine fuel as before.

Figure 6:
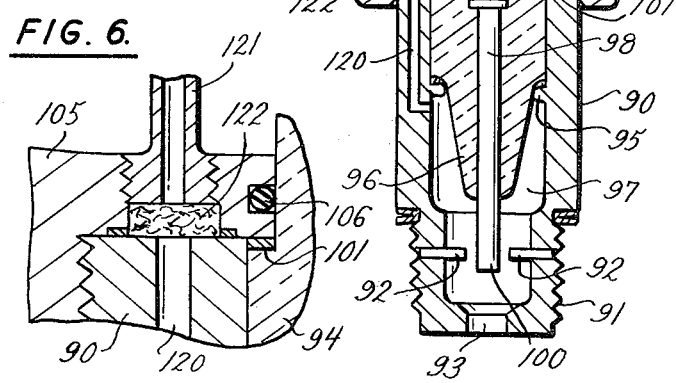
FIG. 6 is an enlarged view of the connection of the standpipe and the gas passage showing the flame arrestor.

Back pressure from the chamber 97 is throttled by the gas passage size and also by a porous metal insert flame arrestor 122 (FIG. 6). However, it is expected that with the temperature generated by the engine and by other reasons, the electrolysis generator will become hot and the pressure will rise therein. This rise of pressure will cause the flow of the gases into the chamber 97. The ball valve and the fitting 117 prevent the exhaust flow of the liquid as well as of the gas from the shell 105 through the fitting 117. However, if the fitting 117 is connected to a source of electrolyte, the subsequent lower pressure caused by the cooling down of the system will automatically produce replenishment by the pressure in the casing 105 becoming lower than the normal atmospheric pressure in the electrolyte storage container.

With this system the top of the standpipe 121 must be sufficiently above the level of the liquid during all normal times so that liquid does not flow into that standpipe. For plugs fitted horizontally appropriate redesign of this feature is anticipated. For example, the member 90 may be bent 90°, and the associated parts similarly turned.

In all of the examples, the gases are delivered directly to the area of the sparkplug electrodes. In the preferred construction, there is a chamber for the mixing of the gases and their ignition at or immediately ahead of the spark gap.

There are various changes and modifications which may be made to applicants' invention as would be apparent to those skilled in the art. However, any of these changes or modifications are included in the teaching of applicants' disclosure and and they intend that their invention be limited only by the scope of the claims appended hereto.

What we claim is:

1. In an arrangement for supplying two gases to an internal combustion engine that may explode when united, without combining them at a distance from the point of combustion, thereby to reduce the hazard of explosive pre-combining of the gases: spark means comprising a body shell having means to mount it on the cylinder of the engine, means associated with the shell providing sealed electrodes to give a spark for ignition; means in said body shell to supply a first pre-combustion gas therein, means in said body shell to supply a second pre-combustion gas therein, and means in said body shell to combine said gases and dispose said combined gases adjacent the electrodes, and means to prevent backflow of gases from the shell.

2. In the device of claim 1 for use with an internal combustion engine: an inner end on the shell with means for securing it into the cylinder of such an internal combustion engine, the first supply means comprising first conduit means attached to the shell and opening through it to conduct one pre-combustion gas into the shell, the second supply means comprising second conduit means to conduct a second pre-combustion gas into the shell to provide a combustible mixture in the shell; each conduit means incorporating a back check valve device to prevent back flow of gas therein; the projecting end of the shell having an outlet opening therethrough for transmission of gases from the shell into the engine.

3. In the device of claim 1 for use in an internal combustion engine, the body shell being a metallic conductive shell for attachment in the sparkplug opening of such an engine; the shell having a mixing chamber in its lower end in which to combine the gases, the chamber having an outlet to open into an engine cylinder, conduit means comprising the means to introduce the two gases into the chamber, check means to permit inflow of the gases but to prevent backflow; and electrodes associated with the chamber to ignite gases therein.

4. The device of claim 2, wherein the shell has internal threads in its end of the shell to receive a spark plug, and has external threads on its outer end for its attachment in the sparkplug opening of the engine.

5. The device of claim 2, with a spark plug secured into the outer end of the shell and providing electrodes in the shell.

6. The device of claim 2, wherein the shell has an opening from top to bottom; an insulator in the shell projecting from the top thereof; one electrode extending through the insulator from top to bottom, and having a connector at its top end to receive a wire; the shell having an electrode at its lower end in opposition to the said one electrode whereby a spark may be produced between them.

7. The device of claim 2, the shell having an insulator therein and projecting from the top thereof; the insulator having an axial conductive core separated from the shell by the insulator, the core having an upper mixing chamber and a lower mixing chamber, the two gas conduits connecting into the upper chamber, gas passage means from the upper to the lower chamber, including a pre-sized orifice, and the core having an electrode extending into the lower chamber, below the core, and cooperative with the shell to provide for ignition.

8. In a combination for use with an internal combustion engine: shell means, means on the shell means to secure it into such an engine at a point for providing normal ignition for the engine; the shell having first electrode means; second electrode means; insulation connecting the second electrode means into the shell but electrically insulated therefrom, the second electrode means extending adjacent the first electrode means adjacent the ignition point, the shell having an outlet for discharge into the engine cylinder, means to supply first and second pre-combustion gases into the shell; means to combine the gases in the shell; means to dispose the pre-combustion gases at the ignition point, and means to prevent backflow of gases into the conduit means to preserve engine compression when the pre-combustion gases are ignited.

9. In the device of claim 8: the conduit means comprising two separate passages to introduce separate gases into the chamber wherein they may be mixed to form a combustible mixture.

10. In the device of claim 8: the insulating means terminating a predetermined distance inward from the gas outlet to provide the chamber, the gas passage means delivering the gas adjacent the top of the chamber.

11. In the device of claim 8: a receptacle providing a first chamber into which the two gases are admitted and wherein they may be mixed, the said first chamber having additional passage means connecting into the pre-combustion chamber.

12. In the device of claim 11: the electrode within the insulation being hollow to provide the first mixing chamber into which the conduits are connected, the electrode having constricted passages in its lower end opening into the first chamber, check valve means between the chambers to prevent backflow from the first chamber to the second chamber.

13. In the device of claim 8: the shell being enlarged to provide an electrolyte chamber, the insulation extending axially through the chamber, a generating electrode within the chamber surrounding but out of electrical contact with the shell, means suspending the electrode within the chamber but electrically insulated therefrom; connections to bring an electric potential to the electrode whereby an electrolyte within the chamber can generate pre-combustion gases, a passage from the upper end of the chamber to the mixing chamber adjacent the sparking electrodes.

14. In combination for use with an internal combustion engine: a hollow shell adapted to contain an electrolyte, and having means to secure it into a sparkplug opening of the engine, the shell providing a first electrode; a spark electrode, means supporting the spark electrode within the shell but insulated therefrom, the spark electrode extending adjacent the first electrode at a location where sparking between them may occur to ignite engine fuel; an additional electrode within the shell, the shell being adapted to receive electrolyte therein in contact with the first and additional electrodes, insulation separating the additional electrode from the first electrode and the spark electrode, means to introduce electric voltage to the first and additional electrodes, the additional electrode being cooperable with the first electrode to generate pre-combustion gases from the electrolyte in the shell; passage means from the shell to the portion of the shell where ignition sparking occurs, the passage means being adapted to conduct pre-ignition gases to the said portion of the shell.

15. In the combination of claim 14: the shell being upright, the sparking electrode extending axially, through the shell from top to bottom and being exposed at the bottom; the insulation extending around the spark electrode and being sealed against the shell at its top and bottom, and with the shell providing a receptacle for electrolytes and passage means from the top of the receptacle to adjacent the ignition point at the bottom of the shell.

* * * * *